Dec. 13, 1955 W. J. McGRATH 2,726,555
COLLAPSIBLE PITMAN ROD
Filed Jan. 12, 1953
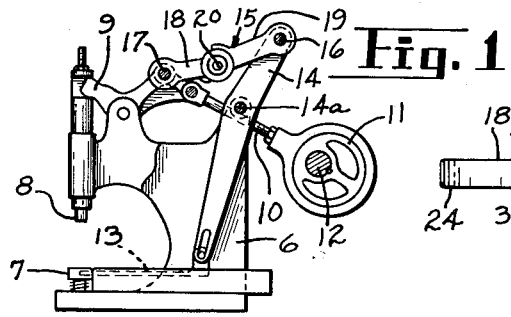
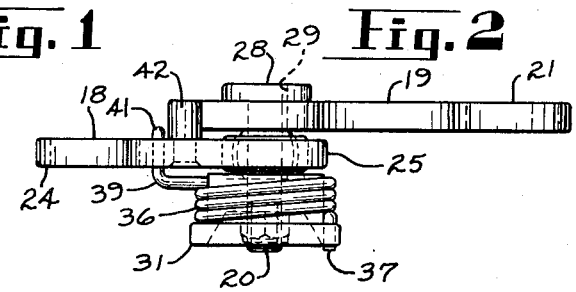
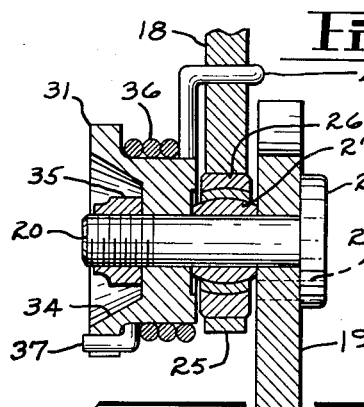
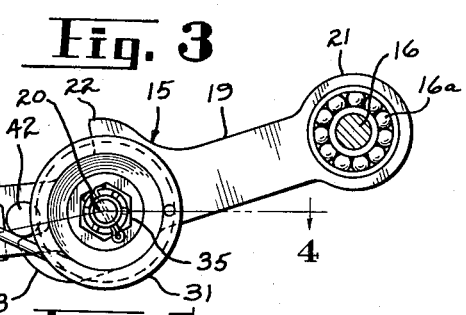
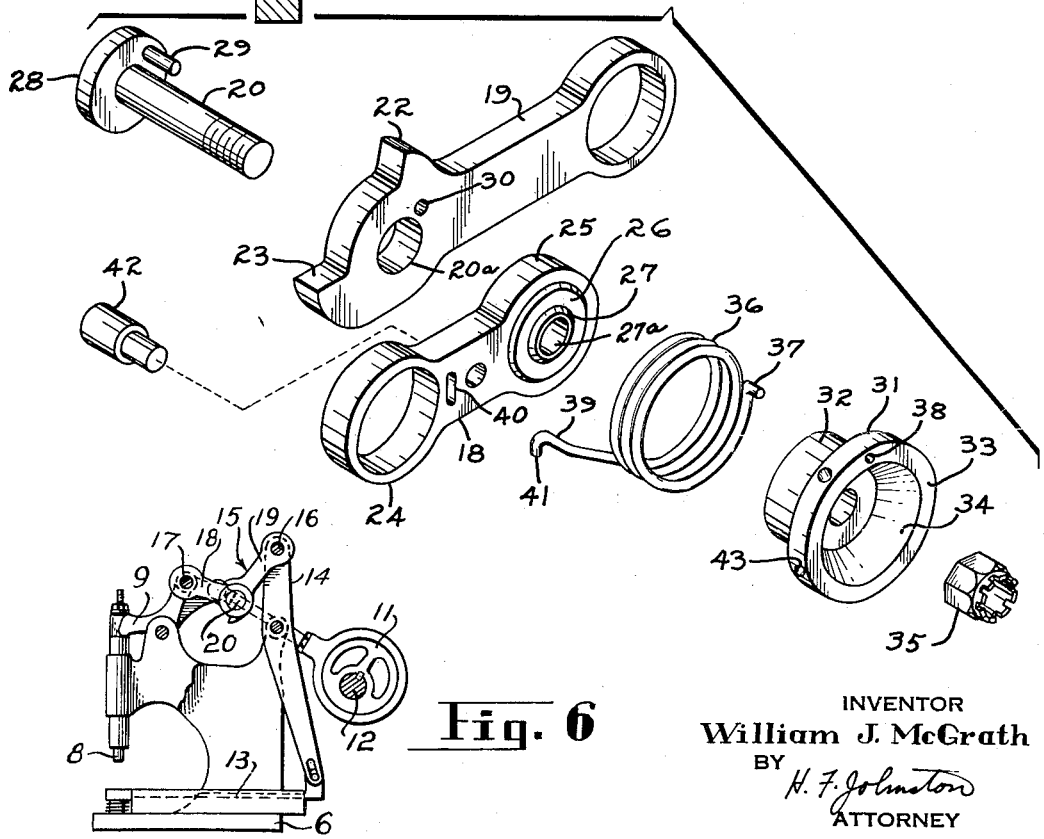
INVENTOR
William J. McGrath
BY
H. F. Johnston
ATTORNEY

United States Patent Office 2,726,555
Patented Dec. 13, 1955

2,726,555

COLLAPSIBLE PITMAN ROD

William J. McGrath, Waterbury, Conn., assignor to Scovill Manufacturing Company, Waterbury, Conn., a corporation of Connecticut Application January 12, 1953, Serial No. 330,785

5 Claims. (Cl. 74—581)

This invention relates to pitman rods and particularly to a collapsible rod which will collapse when an abnormal operating force is applied thereto.

Heretofore safety connections have been provided so that if an operaing member of a machine meets abnormal resistance, which connections have generally taken the form of a yielding member, whereby when a connected part of the machine becomes stuck a spring or the like will be compressed. One objection to such a safety connection is that any adjustment in the yielding member to vary the load on the spring involves a change in the effective length of the connection itself, thus requiring compensating adjustment in the connected part operated by the pitman.

Another advantage of my invention is that once the predetermined load required to release the safety connection has been reached the pitman rod will collapse and allow the driving end to continue its path of travel without applying additional force on the driven part.

A further object of the invention is to provide a collapsible connection having the above characteristics and advantages which can also be adjusted to vary the resistance to the collapsing of the rod.

Other objects and advantages of the invention will be pointed out in the detailed description thereof which follows or will be apparent from such description.

In the figures:

Fig. 1 is a front elevational view of a portion of a typical machine to which the pitman rod may be applied.

Fig. 2 is a plan view of the rod, per se.

Fig. 3 is a front elevational view of the same.

Fig. 4 is a sectional view through the mid portion of the rod, the view taken along the line 4—4 of Fig. 3.

Fig. 5 is an exploded perspective view of the several parts which make up the rod, and Fig. 6 is a view similar to Fig. 1 showing the condition of the machine with the pitman rod in a partially collapsed state.

Referring now to the drawing wherein like numerals designate like parts in the several views, the numeral 6 refers generally to a machine head such as used in fastener setting machines. This machine is provided with the usual stationary anvil 7 and has a reciprocating plunger 8 slidably mounted in the head in line with the anvil 7. The plunger 8 is operated by a bell-crank lever 9 which in turn is connected to one end of a connecting rod 10 operated by an eccentric 11 on a power shaft 12. A feed slide 13 is slidably mounted on the head 6 and is operated by a lever 14 pivoted on the head as at 14a. The upper end of lever 14 is connected to one end of a collapsible pitman rod 15 by a pivot connection 16 while the opposite end of the rod 15 is joined to the bell crank lever 9 at a pivot connection 17. The collapsible pitman rod 15 is the subject of this invention.

The pitman rod 15 consists of a pair of links 18 and 19 joined together at their adjacent ends by a pivot stud 20 which constitutes the middle joint of said pitman rod 15. As best shown in Fig. 3 the links 18 and 19 are normally disposed at an angle to one another as will be more fully described later. These links 18 and 19 may be of equal length or either one may be somewhat longer than the other. As herein shown the link 18, which connects to the bell crank lever 9 and considered the driving member, is shorter than the link 19 which connects to the lever 14 and is considered the driven member. The longer link 19 is formed with a ring housing 21 at its outer end by means of which the lever 19 may be joined to the pivot connection 16 on lever 14 preferably through a ball bearing unit 16a. The inner end of the link 19 is provided with a bore 20a to receive the pivot stud 20 and is also formed with a pair of projecting upper and lower lugs 22 and 23, respectively, for reasons as will appear later.

The left or short link 18 is also formed with a ring housing 24 at its outer end through which said link 18 is joined to the pivot connection 17 on the bell-crank lever 9 through a ball bearing unit 17a. The opposite or inner end of the link 18 is also formed with a similar ring housing 25 within which is fitted a self-aligned bearing 26. The inner race 27 of the bearing 26 is provided with a bore 27a through which the stud 20 projects for pivotally joining the two links 18 and 19 together in side by side relationship as shown in Fig. 2. As best shown in Fig. 5 the pivot stud 20 has an enlarged cylindrical head 28 that seats against the outer face of the link 19. Projecting from the inner face of the stud head 28 is a pin 29 that fits into an opening 30 in link 19 so as to prevent the stud 20 from turning in the link 19.

The purpose of ball bearing units 16a and 17a, in addition to their usual function of ease of rotative operation, is to eliminate any backlash at the end connections 16 and 17 of the pitman rod 15 to its respective driving and driven members 9 ann 14, and the self-aligning bearing 26 at the mid joint of said rod is to allow for any misalignment that may result in bearing joints of said rod to said driving and driven members.

In order to hold the two links in their normal angular relationship under constant tension by a yielding means such as a spring 36 and wherein the angular relationship is established by the lug 23 on the driven link 19 abutting against a stop pin 42 on the driver link 18, provision is made for a tension knob 31 that is rotatably fitted upon the pivot stud 20. The knob 31 consists of a cylindrical barrel portion 32 and an integral enlarged head 33 having a beveled recess 34 in its outer end. As shown in Fig. 4 the inner race 27 of the bearing 26 is somewhat wider than the normal width of said bearing. One end of the race 27 is abutted against the adjacent face of the longer link 19 while the inner face of the knob 31 rests against the opposite end of the inner race 27 and all three parts 19, 27 and 31 are bound together as a unit by a castellated nut 35 fitted on the threaded end of the stud 20 with the nut 35 confined within the beveled recess 34 of said knob head 33. The coiled spring 36 is wrapped around the cylindrical portion 32 of the knob 31 and is provided at one end with an angular bend or hook 37 that is fitted into a recess 38 in the head 33 of the knob 31. The opposite end of the spring 36 is formed with an extension 39 that passes through an elongated slot 40 in the link 18 and the extension 39 terminates in a hooked end 41 to prevent the extension 39 from pulling out of the link 18 when the spring 36 is tensioned. As best shown in Fig. 4 the knob 31, bearing inner race 27 and link 19 (by reason of the pin 29 on the stud head 28 engaging in link 19) are held together as a unit on the stud 20 and held against relative movement by means of the castellated nut 35. The spring 36 when wound about the drum 32 and anchored in the head of knob 31 tends to urge the link 18 in a counterclockwise direction as viewed in Fig. 3, but the desired angular position of the links 18 and 19 is maintained by reason of a stop pin 42 projecting from one side of the link 18 and engaging against the lower lug 23 on the link 19. The upper lug 22 on link 19 is also adapted to strike the stop pin 42 to limit the angular collapsing movement of the links 18 and 19. This lug 22 comes into use only when the machine is operated manually for test purposes.

In the operation of the pitman rod 15 it is to be observed that the angular relationship of the links 18 and 19 are only slightly off from a straight line drawn through the connecting centers of said links 18 and 19 so as to impart an almost straight line thrust from the driving bell-crank 9 to the driven lever 14. As shown in the drawing it is preferable that the angular relationship of the links 18 and 19 be downwardly directed because of the fact that the end pivot points of the pitman rod 15 swing in an upwardly directed arc. It is to be understood that in the general fastener machine to which this pitman rod 15 is attached the drive eccentric 11 will make only one revolution for each setting operation performed. During the first half revolution of the eccentric 11 the lever 9 will swing in a counterclockwise direction to operate the plunger 8 and at the same time drawing the pitman rod 15 to the left as viewed in Fig. 1 to operate the lever 14 in retracting the feed slide 13. During the second half revolution of the eccentric the lever 9 will be rotated in a clockwise direction withdrawing the plunger 8 and reversing the operation of the pitman rod 15 to advance the feed slide 13 for feeding a fastener element to the setting station. In case any of the operating tools in the machines should jam, such as the feed slide 13 and prevent further rotation of the lever 14, the two links 18 and 19 would then knuckle downwardly or collapse toward each other against the influence of the coiled spring 36 any time during the second half period of the one-revolution cycle of the main drive shaft 12 and eccentric 11 and thus saving the operating tools of the machine.

In case it is desired to increase or loosen the tensional factor imparted to the links 18 and 19 by the spring 36 it is only necessary to loosen the nut 35 and by placing a pointed tool in one of the series of openings 43 in the rim of the tension knob 31 and by turning the knob 31 in a counterclockwise direction as viewed in Fig. 3 the spring tension can be increased or by turning the knob 31 in the opposite clockwise direction the spring tension can be decreased and the nut re-tightened when the proper tension is obtained. It is to be noted that by reason of this particular construction the adjustment of the tensional factor of the pitman rod can be made without disturbing in any way the connection points of said rod 15, such as would throw the operating tools of the machine out of adjustment.

One form of the invention is presented herein for the purpose of exemplification, but it will, of course, be appreciated that the invention is susceptible of embodiment in other structurally modified forms coming equally within the scope of the appended claims.

I claim:
1. A collapsible pitman rod comprising two links and having means at its opposite ends for pivotal connection with the driven and drive elements of a machine, a stud member joining the adjacent ends of said links in side-by-side relationship and having rigid non-rotatable connection with one of said links and pivotal connection with the other of said links, a coil spring surrounding said stud and having one end anchored to said stud and the opposite end anchored to said link in which said stud pivots, and means for holding said links in predetermined angular relationship within the angle in which the rod is adapted to collapse and under the tension of said spring.

2. A collapsible pitman rod as defined by claim 1 wherein the means for anchoring said spring to said stud is adjustable.

3. A collapsible pitman rod of the yieldable type comprising two links and having means at its opposite ends for pivotal connection with the driven and drive elements of a machine, a stud member joining the adjacent ends of said links in side-by-side relationship and having rigid connection with one of said links and pivotal connection in the other of said links, a knob member having a drum rotatable on said stud, a coiled spring surrounding said drum section and having one end anchored to said knob member and the other end anchored to the link in which said stud pivots, means for holding said knob member under tension imparted to it by said spring against rotation on said stud, and means for holding said links in predetermined angular relationship under the tension of said spring.

4. A collapsible pitman rod of the yieldable type comprising two links and having means at its opposite ends for pivotal connection with the driven and drive elements of a machine, a stud member joining the adjacent ends of said links in side-by-side relationship and having rigid connection with one of said links and pivotal connection in the other of said links, said pivotal connection comprising an anti-friction bearing having an inner race mounted on said stud, a knob member having a drum rotatable on said stud, a coiled spring surrounding said drum section and having one end anchored to said knob member and the other end anchored to said pivotal link, means for locking together said knob member, said inner race, said stud member and the link to which it is secured as a unit, and means for holding said links in predetermined angular relationship under the tension of said spring.

5. A collapsible pitman rod as defined in claim 4 wherein said anti-friction bearing is a spherical bearing that will allow for any mis-alignment of said links.

References Cited in the file of this patent
UNITED STATES PATENTS

| | | |
|---|---|---|
| 685,713 | Cilley | Oct. 29, 1901 |
| 1,349,033 | Zeh | Aug. 10, 1920 |
| 1,432,144 | Wright | Oct. 17, 1922 |
| 2,280,246 | McCullough | Apr. 21, 1942 |